UNITED STATES PATENT OFFICE.

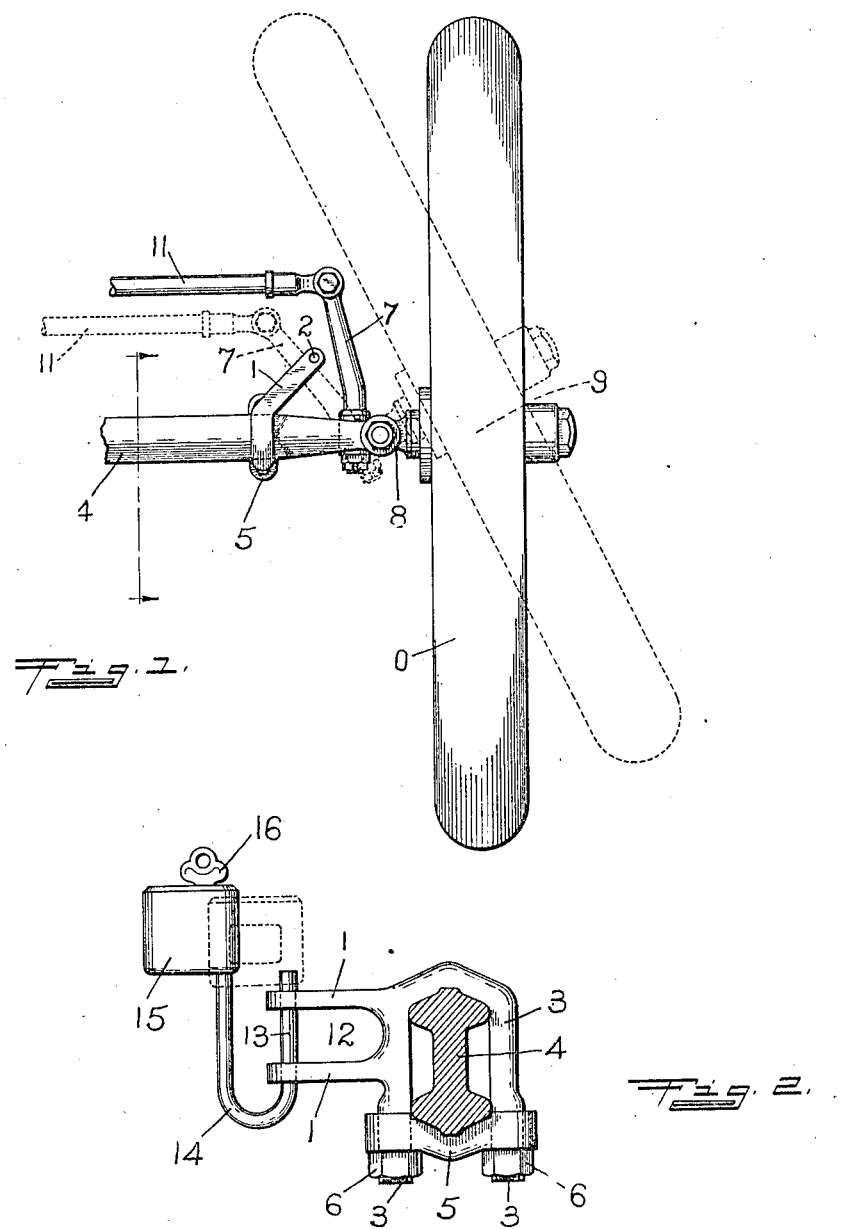

HOWARD D. ESHELMAN, OF WOODBINE, IOWA.

AUTOMOBILE-LOCK.

1,207,004.

Specification of Letters Patent.

Patented Dec. 5, 1916.

Application filed August 24, 1916. Serial No. 116,601.

*To all whom it may concern:*

Be it known that I, HOWARD D. ESHELMAN, a citizen of the United States, residing at Woodbine, in the county of Harrison and State of Iowa, have invented certain new and useful Improvements in Automobile-Locks, and have described the same in the following specification, illustrated by the accompanying drawings.

My invention relates to that class of locks which are applicable to automobiles having knuckle joints in their front axles and are adapted to stay such vehicles by prevention of steering.

It is the object of the invention to simplify the construction and operation of a lock of this class; to produce the lock at low cost, and render the same conveniently and cheaply applicable to existing types of automobile construction; to apply the lock immediately to the steering arm and the associated axle of the vehicle; to lock the bearing wheels of this axle in an unchangeable oblique position relatively thereto; at the same time to prevent the locking apparatus from being rendered inoperative by sand or mud; and in general to produce a superior lock of the specified class.

In said drawings, illustrating the best manner in which I have contemplated applying the principles of the invention, Figure 1 is a plan of associated parts of an automobile, of a familiar type, having a lock which is constructed and applied in accordance with these principles. Fig. 2 comprises a section on the section line of Fig. 1 and an elevation of the whole of the same lock.

In the illustrated specimen of my invention, the steel bracket forming part of the locking apparatus, comprises two horizontally disposed spaced arms 1, which are perforated at the free end of the bracket with the vertically alined bolt-holes 2 respectively. It has two vertical spaced legs 3, hugging the axle 4, and is permanently secured thereto, in the position shown, by the aid of the transverse clamping-plate 5 under the axle. This plate is adjusted on the legs by the nuts 6, which may then be secured thereon by riveting the free ends of the legs against the nuts. The bracket, being of this description, is mechanically equivalent to a bifurcated lug formed integrally with the axle, and is readily affixed in the described manner to the front axle of a previously constructed automobile of any of the common makes. Being united with the axle in the position shown, the horizontal arms 1 extend obliquely from the axle 4 toward or beyond the steering arm 7 of the knuckle 8, whose stub axle 9 carries the bearing wheel 10. This steering arm, which is connected by the tie-rod 11 with a similar steering arm at the opposite end of the axle, is not obstructed by the bracket, positioned as described, but can be swung pivotally into and out of the recess 12 between the bracket arms as occasion may require. When so turned to the position indicated by broken lines in Fig. 1, the steering arm may be retained in this recess, during the disuse of the vehicle, by means of the removable bolt 13, which is for this purpose inserted by hand in the bolt-holes 2, as shown in Fig. 2, and is made fast therein as often as may be desired. Preferably this bolt is part of the slidable bow 14 of the small removable padlock 15 having the key 16. When the steering arm is thus locked in this recess, the bearing wheel is thereby retained in the cramped position shown by broken lines in Fig. 1, and the vehicle cannot be steered. In this way and by these means the above specified object of the invention is operatively attained in all its branches.

I claim as my invention—

1. An automobile lock of the specified class, comprising a bracket affixed rigidly to the front axle of the vehicle and having spaced arms, one above the other, adapted to admit the associated knuckle arm between them whenever the latter is turned pivotally to a predetermined position, and removable means connecting the spaced arms and retaining the knuckle arm in that position.

2. An automobile lock of the specified class, comprising a pair of spaced arms secured to the front axle of the vehicle and horizontally positioned to admit the associated knuckle arm between them, and means for retaining that arm when so admitted.

3. An automobile lock of the specified class, comprising a bracket having a pair of spaced horizontal arms adapted to admit between them the associated steering arm of the vehicle when that arm is turned pivotally to a predetermined position, means for clamping the bracket to an axle of the vehicle, and a removable stop bolt spanning the arms of the bracket to retain the steering arm between them.

4. An automobile lock of the specified class, comprising a bracket having two horizontal spaced arms to accommodate the associated steering-knuckle arm between them, and having two vertical legs to accommodate the associated vehicle axle between them; a transverse clamping plate on the legs below the axle; nuts on the legs for clamping the bracket to the axle; a removable bolt through the arms to retain the steering-knuckle arm between them; and means for securing the bolt in the retaining position.

Witness my signature at Omaha, Nebraska, August 21, 1916.

HOWARD D. ESHELMAN.

Copies of this patent may be obtained for five cents each, by addressing the "Commissioner of Patents, Washington, D. C."